(12) United States Patent
Hattori

(10) Patent No.: US 10,530,205 B2
(45) Date of Patent: Jan. 7, 2020

(54) ROTARY ELECTRIC MACHINE

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 62 days.

(21) Appl. No.: 15/801,706

(22) Filed: Nov. 2, 2017

(65) Prior Publication Data

US 2018/0145552 A1     May 24, 2018

(30) Foreign Application Priority Data

Nov. 15, 2016   (JP) ................... 2016-222475

(51) Int. Cl.
*H02K 21/12*     (2006.01)
*H02K 1/27*      (2006.01)

(52) U.S. Cl.
CPC .................. *H02K 1/2766* (2013.01)

(58) Field of Classification Search
CPC ................................................ H02K 1/2766
See application file for complete search history.

(56) References Cited

U.S. PATENT DOCUMENTS

| 2005/0140236 A1* | 6/2005 | Jeong | H02K 1/2766 310/156.53 |
| 2010/0079026 A1* | 4/2010 | Han | H02K 1/2766 310/156.53 |
| 2010/0141076 A1* | 6/2010 | Blissenbach | H02K 1/2766 310/156.53 |
| 2011/0001382 A1* | 1/2011 | Leonardi | H02K 1/2766 310/156.53 |
| 2011/0198959 A1* | 8/2011 | Vyas | B60L 50/51 310/156.21 |
| 2012/0194026 A1* | 8/2012 | Matsuoka | H02K 1/2766 310/156.53 |
| 2013/0147299 A1* | 6/2013 | Rahman | H02K 1/2706 310/156.01 |
| 2013/0270952 A1 | 10/2013 | Jurkovic et al. | |

FOREIGN PATENT DOCUMENTS

| CN | 103378699 A | 10/2013 |
| JP | 2005-198487 A | 7/2005 |
| JP | 2007-274798 A | 10/2007 |
| JP | 2011-223836 A | 11/2011 |
| JP | 2011-229395 A | 11/2011 |
| JP | 2012-161207 A | 8/2012 |
| JP | 2012-178922 A | 9/2012 |

* cited by examiner

*Primary Examiner* — Yuriy Semenenko
(74) *Attorney, Agent, or Firm* — Sughrue Mion, PLLC

(57) ABSTRACT

A rotary electric machine includes a stator and a rotor. The rotor includes a rotor core and a plurality of permanent magnets. The permanent magnets are disposed to be divided into two layers, the two layers being a layer on the outer peripheral side and a layer on the inner peripheral side of the rotor core, and the permanent magnets are disposed line-symmetrically with respect to a magnetic pole center of the rotor core and in a V-shape or a U-shape in each of the two layers. An angle that each of the permanent magnets disposed on the outer peripheral side makes with the magnetic pole center of the V-shape or the U-shape is larger than an angle that each of the permanent magnets disposed on the inner peripheral side makes with the magnetic pole center of the V-shape or the U-shape.

5 Claims, 5 Drawing Sheets

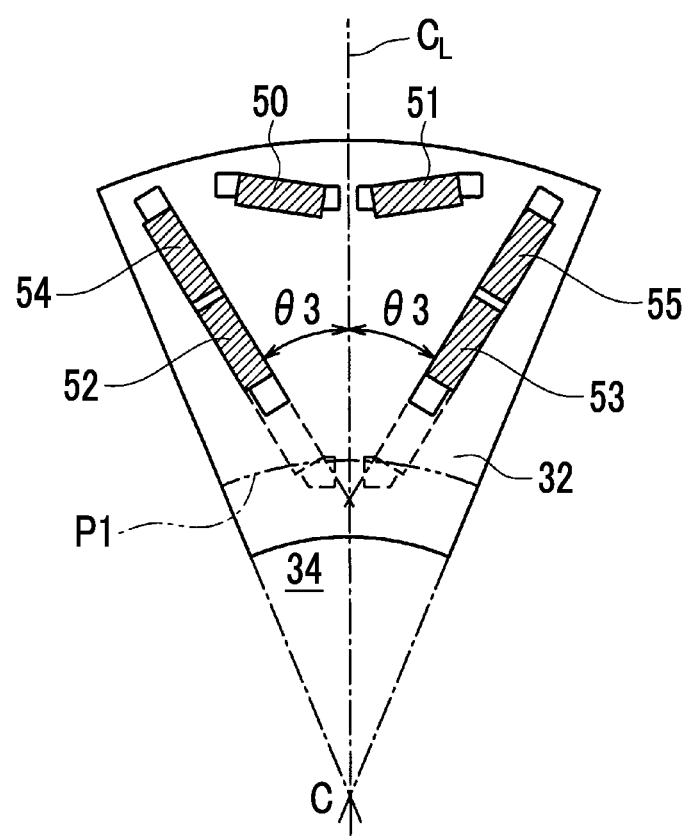

ROTARY ELECTRIC MACHINE

INCORPORATION BY REFERENCE

The disclosure of Japanese Patent Application No. 2016-222475 filed on Nov. 15, 2016 including the specification, drawings and abstract is incorporated herein by reference in its entirety.

BACKGROUND

1. Technical Field

The disclosure relates to a rotary electric machine and in particular, to a rotary electric machine which is provided with an embedded magnet type rotor.

2. Description of Related Art

With respect to a rotary electric machine which is used in an electric vehicle, in order to attain reduction in size and weight and improvement in output efficiency, an embedded magnet type rotary electric machine is used in which a plurality of permanent magnets is embedded along a circumferential direction in a rotor core to form magnetic poles. The embedded magnet type rotary electric machine outputs combined torque of magnetic torque which is generated by cooperation of a rotating magnetic field of a stator with the permanent magnets and reluctance torque which is generated based on a magnetic anisotropy of the rotor core. By disposing a plurality of embedded magnets in a V-shape within one magnetic pole, it is possible to further improve the output efficiency, and by disposing the embedded magnets in two layers along a radial direction, it is possible to further increase torque that can be output.

In Japanese Unexamined Patent Application Publication No. 2011-223836 (JP 2011-223836 A), with respect to a two-layered embedded magnet type rotary electric machine, a magnetic field analysis using an optimal distance index $\gamma=\beta/\alpha$, in which a magnet-to-magnet distance along a radial direction between a V-shaped permanent magnet which is disposed on the inside and a V-shaped permanent magnet which is disposed on the outside is set to be $\beta$ and the radius of a rotor is set to be $\alpha$, is described.

In a two-layered embedded magnet type rotary electric machine of Japanese Unexamined Patent Application Publication No. 2007-274798 (JP 2007-274798 A), a permanent magnet which is disposed on the outer peripheral side is susceptible to demagnetization during field weakening, and therefore, permanent magnets having two types of shapes; a permanent magnet which is disposed on the inner peripheral side, and a permanent magnet which is disposed on the outer peripheral side and has a narrower width and a greater thickness than the permanent magnet which is disposed on the inner peripheral side, are used to be divided.

In Japanese Unexamined Patent Application Publication No. 2005-198487 (JP 2005-198487 A), it is mentioned that in a multilayered embedded magnet type rotary electric machine, stress acting on a center bridge between permanent magnets adjacent to each other due to a centrifugal force or an excitation force due to the rotation of the rotary electric machine increases as the mass of an embedded magnet becomes larger. It is disclosed that the permanent magnet becomes longer in length along a circumferential direction and larger in mass as it moves toward a layer which is disposed on the inner peripheral side along a radial direction in a multilayer, and therefore, the length along the circumferential direction of the center bridge is increased accordingly.

SUMMARY

In a two-layered embedded magnet type rotor, the length along the circumferential direction of a permanent magnet of a layer on the inner peripheral side is longer than the length along the circumferential direction of a permanent magnet of a layer on the outer peripheral side. Therefore, when the width of a magnetic path which is formed between the permanent magnet of the layer on the outer peripheral side and the permanent magnet of the layer on the inner peripheral side is constant along the circumferential direction, when a magnetic flux passing through the permanent magnet of the layer on the inner peripheral side is directed to the permanent magnet of the layer on the outer peripheral side, local denseness of magnetic fluxes can occur. If the magnetic fluxes passing through the magnetic path locally gather densely, saturation of magnetic flux density occurs, and thus there is a possibility that the torque of the rotary electric machine may decrease. Therefore, a rotary electric machine is desired in which in the two-layered embedded magnet type rotor, the saturation of the magnetic flux density is relieved, and thus a decrease in torque can be suppressed.

A rotary electric machine according to an aspect of the disclosure includes: a stator around which a stator coil is wound; and a rotor which is concentrically disposed with a predetermined gap with respect to the inner peripheral side of the stator. The rotor includes a rotor core and a plurality of permanent magnets. The permanent magnets are embedded in the rotor core. The permanent magnets are disposed to be divided into two layers, the two layers being a layer on the outer peripheral side and a layer on the inner peripheral side of the rotor core, and the permanent magnets are disposed line-symmetrically with respect to a magnetic pole center of the rotor core and in a V-shape or a U-shape in each of the two layers. An angle that each of the permanent magnets disposed on the outer peripheral side makes with the magnetic pole center of the V-shape or the U-shape is larger than an angle that each of the permanent magnets disposed on the inner peripheral side makes with the magnetic pole center of the V-shape or the U-shape.

According to the rotary electric machine of the aspect of the disclosure, the angle that each of the permanent magnets of a layer on the outer peripheral side makes with the magnetic pole center is larger than the angle that each of the permanent magnets of a layer on the inner peripheral side makes with the magnetic pole center. In this way, with respect to a magnetic path between the two layers, the magnetic path on the magnetic pole center side becomes wider than the magnetic path on the magnetic pole end side, and therefore, it is possible to relieve saturation of magnetic flux density in the magnetic path between the two layers and suppress a decrease in torque of the rotary electric machine.

In the rotary electric machine according to the aspect of the disclosure, the angle that each of the permanent magnets which are disposed on the inner peripheral side makes with the magnetic pole center of the V-shape or the U-shape may decrease with increasing distance from the magnetic pole center.

In the rotary electric machine according to the aspect of the disclosure, the V-shape or the U-shape in which the permanent magnets are disposed on the inner peripheral side may be bent at at least one location along a direction away from the magnetic pole center.

According to the rotary electric machine of the aspect of the disclosure, the rotor and the rotary electric machine can be downsized as compared with a case where the angle that each of the permanent magnets which are disposed on the inner peripheral side makes with the magnetic pole center is constant, while the saturation of the magnetic flux density in the magnetic path between the two layers is relieved.

In the rotary electric machine according to the aspect of the disclosure, the number of the permanent magnets which are disposed on the outer peripheral side may be two or more, and the number of the permanent magnets which are disposed on the inner peripheral side may be four or more, per one magnetic pole of the rotary electric machine.

In the rotary electric machine according to the aspect of the disclosure, a length along the circumferential direction of a center bridge of the V-shape or the U-shape in which the permanent magnets are disposed on the inner peripheral side may be longer than a length along the circumferential direction of a center bridge of the V-shape or the U-shape in which the permanent magnets are disposed on the outer peripheral side. Each of the center bridges may be a portion of the rotor core, which is located between the permanent magnets which are disposed with the magnetic pole center interposed between the permanent magnets.

The stress acting due to a centrifugal force or an excitation force due to the rotation of the rotary electric machine increases as the size of each of the permanent magnets which are embedded becomes larger. According to the rotary electric machine of the aspect of the disclosure, the length of the center bridge on the inner peripheral side where the number of magnets is larger in the two layers is longer than the length of the center bridge on the outer peripheral side, and therefore, the stress taken on the center bridge on the outer peripheral side and the stress taken on the center bridge on the inner peripheral side are equalized, and thus damage to the center bridges can be suppressed.

According to the rotary electric machine of the aspect of the disclosure, in a two-layered embedded magnet type rotor, the saturation of the magnetic flux density is relieved, and thus a decrease in torque can be suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7 is a diagram showing one magnetic pole in a case where the relationship of θ2 =θ3 is established by matching θ2 in FIG. 3 to θ3, as another comparative example.

DETAILED DESCRIPTION OF EMBODIMENTS

Figure 1:
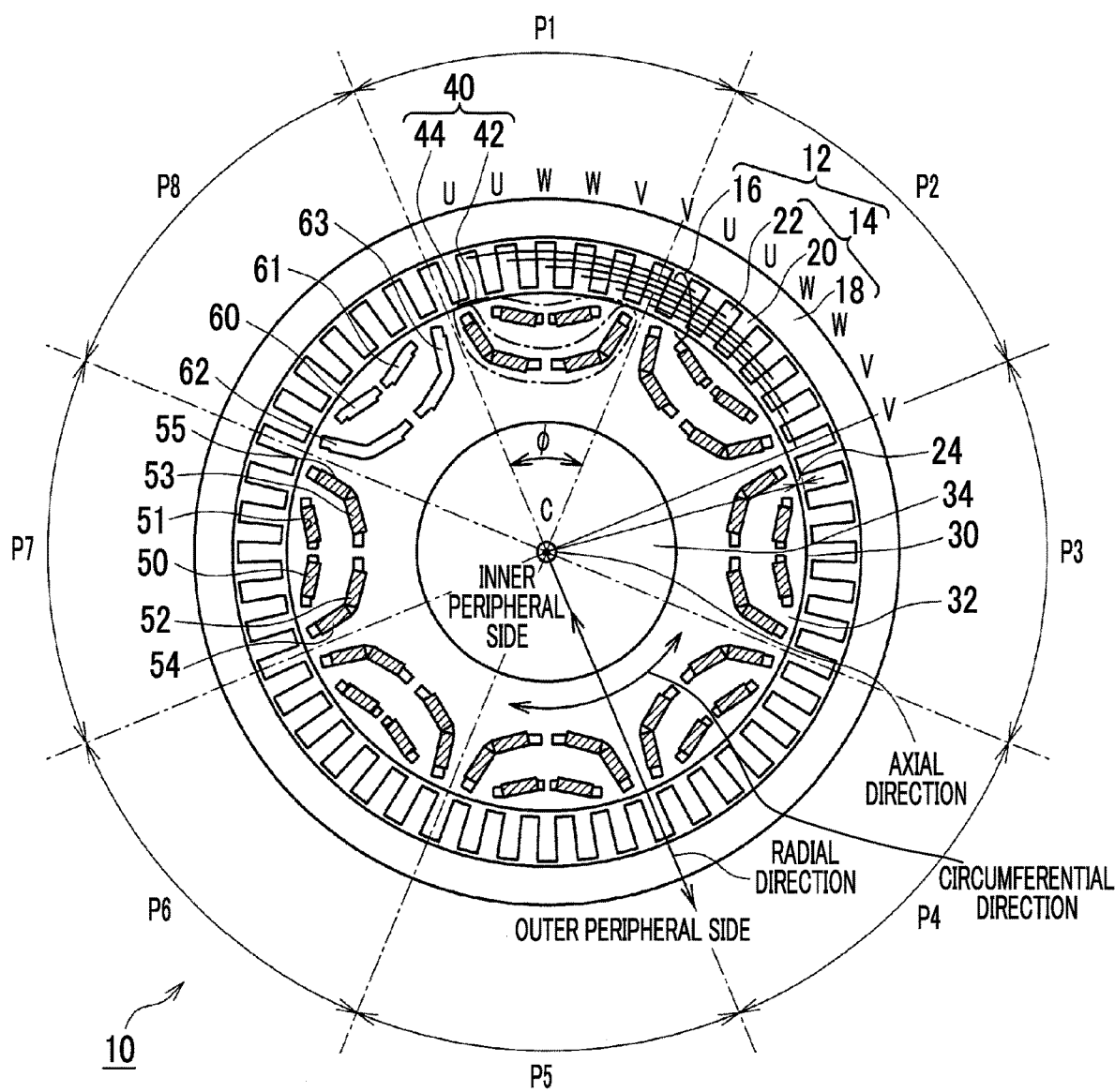
FIG. 1 is a configuration diagram of a rotary electric machine according to an embodiment.

Hereinafter, an embodiment related to the disclosure will be described in detail using the drawings. In the following, a rotary electric machine which is mounted on a vehicle will be described. However, this is merely an example for explanation, and the rotary electric machine may be used for uses other than mounting on a vehicle. In the following, a method of winding a stator coil will be described as distributed winding. However, this is merely an example for explanation, and the winding method may be concentrated winding.

The shapes, the dimensions, the number of teeth, the number of slots, the number of magnetic poles of a rotor, the number of permanent magnets, the material, and the like, which are described below, are merely examples for explanation and can be appropriately changed in accordance with the specifications of a rotary electric machine. In the following, in all the drawings, the same elements are denoted by the same reference numerals, and overlapping description is omitted.

FIG. 1 is a diagram showing the configuration of a rotary electric machine 10 which is mounted on a vehicle. The rotary electric machine 10 is a motor-generator which functions as an electric motor when the vehicle is in powering and functions as a generator when the vehicle is in a braking state, under the control of a driving circuit (not shown), and is a three-phase synchronous rotary electric machine. The rotary electric machine 10 is composed of a stator 12 that is a stator, and a rotor 30 that is a rotor which is disposed on the inner peripheral side of the stator 12 with a predetermined gap therebetween.

The stator 12 includes a stator core 14 and a stator coil 16. The stator core 14 is an annular magnetic body component and includes an annular back yoke 18 and a plurality of teeth 20 protruding toward the inner peripheral side from the back yoke 18. The space between the teeth 20 adjacent to each other is a slot 22. In the example of FIG. 1, the number of the teeth 20 and the number of the slots 22 are the same and each are 48 that is a multiple of 3.

The stator core 14 is a laminated body which includes the back yoke 18 and the teeth 20 and in which a predetermined number of annular magnetic body thin plates each shaped into a predetermined shape such that the slots 22 are formed therein are stacked in an axial direction. Electrical insulation treatment is applied to both surfaces of the magnetic body thin plate. As a material of the magnetic body thin plate, an electromagnetic steel sheet which is a type of silicon steel sheet can be used. Instead of the laminated body composed of the magnetic body thin plates, an integrated molding of magnetic powder may be used as the stator core 14.

The stator coil 16 is a three-phase distributed winding coil, and one phase winding is formed by being wound to straddle the teeth 20. In FIG. 1, partial winding of the stator coil 16 is shown. Here, U, V, W applied to the respective slots 22 indicate the phases of the windings which are wound around the respective slots 22. For example, a U-phase winding is formed by repeating the processes of being inserted into the slot 22 marked by U, extended in a circumferential direction from the slot 22 with the U-phase winding inserted therein, and then inserted into the next U-marked slot 22 separated by six slots from the slot 22 with the U-phase winding inserted therein. The same applies to a V-phase winding and a W-phase winding.

The rotor 30 is an annular rotor which is concentrically disposed with a predetermined magnetic gap 24 with respect to the inner periphery of the stator 12. The rotor 30 includes a rotor core 32 and a center hole 34. A rotor shaft that is an output shaft of the rotary electric machine 10 is fixed to the center hole 34 of the rotor 30. The center position of the center hole 34 is denoted by C. In FIG. 1, a radial direction, a circumferential direction, and an axial direction are indicated. The radial direction is a radial direction connecting the center position C and the outer peripheral side of the stator 12, in which the direction toward the center position C side is a direction toward the inner peripheral side and the direction toward the outer peripheral side of the stator 12 is a direction toward the outer peripheral side. The circumferential direction is a direction extending along the circumferential direction with the center position C as the center. The axial direction is a direction in which the rotor shaft inserted into the center hole 34 extends, and is a direction perpendicular to the plane in FIG. 1.

The rotor 30 has eight magnetic poles, and an anticipated angle θ along the circumferential direction for one magnetic pole as viewed from the center position C is 45 degrees. In FIG. 1, the eight magnetic poles are denoted by P1 to P8, respectively. The respective magnetic poles denoted by P1 to P8 have the same configuration except for the disposition positions. Therefore, with respect to several representative magnetic poles, a plurality of permanent magnets, a plurality of magnet holes, and the like in each magnetic pole will be described.

As shown in the magnetic pole P1, each magnetic pole has an embedded magnet part 40 disposed in a two-layered structure having a layer on the outer peripheral side and a layer on the inner peripheral side along the radial direction. When distinguishing the respective layers of the two-layered structure of the embedded magnet part 40 from each other, the layer on the outer peripheral side is referred to as an outer embedded magnet part 42, and the layer on the inner peripheral side is referred to as an inner embedded magnet part 44.

In both the outer embedded magnet part 42 and the inner embedded magnet part 44, a plurality of permanent magnets is inserted into the magnet holes. In FIG. 1, the permanent magnets are hatched, and therefore, the magnet hole is partially shown as portions which are not hatched at the end portions in a longitudinal direction of the permanent magnet. However, it is somewhat difficult to know the shape of the magnet hole as it is. Therefore, in the magnetic pole P8, the illustration of the permanent magnets is omitted and solely the magnet holes are shown. As shown in the magnetic pole P8, each magnetic pole has magnet holes 60, 61, 62, 63. The magnet holes 60, 61 belong to the outer embedded magnet part 42, and the magnet holes 62, 63 belong to the inner embedded magnet part 44.

In the magnetic pole P7, a plurality of permanent magnets 50, 51, 52, 53, 54, 55 which is inserted into the magnet holes 60, 61, 62, 63 are shown. Referring to the magnetic pole P1 and the magnetic pole P8, in the outer embedded magnet part 42, the permanent magnet 50 is inserted into the magnet hole 60 and the permanent magnet 51 is inserted into the magnet hole 61. In the inner embedded magnet part 44, the permanent magnets 52, 54 are inserted into the magnet hole 62 and the permanent magnets 53, 55 are inserted into the magnet hole 63.

The respective magnetic poles denoted by P1 to P8 have the same configuration, and therefore, in the following, with respect to the magnetic pole P1, the detailed configurations of the outer embedded magnet part 42 and the inner embedded magnet part 44 will be described using FIG. 2.

Figure 2:
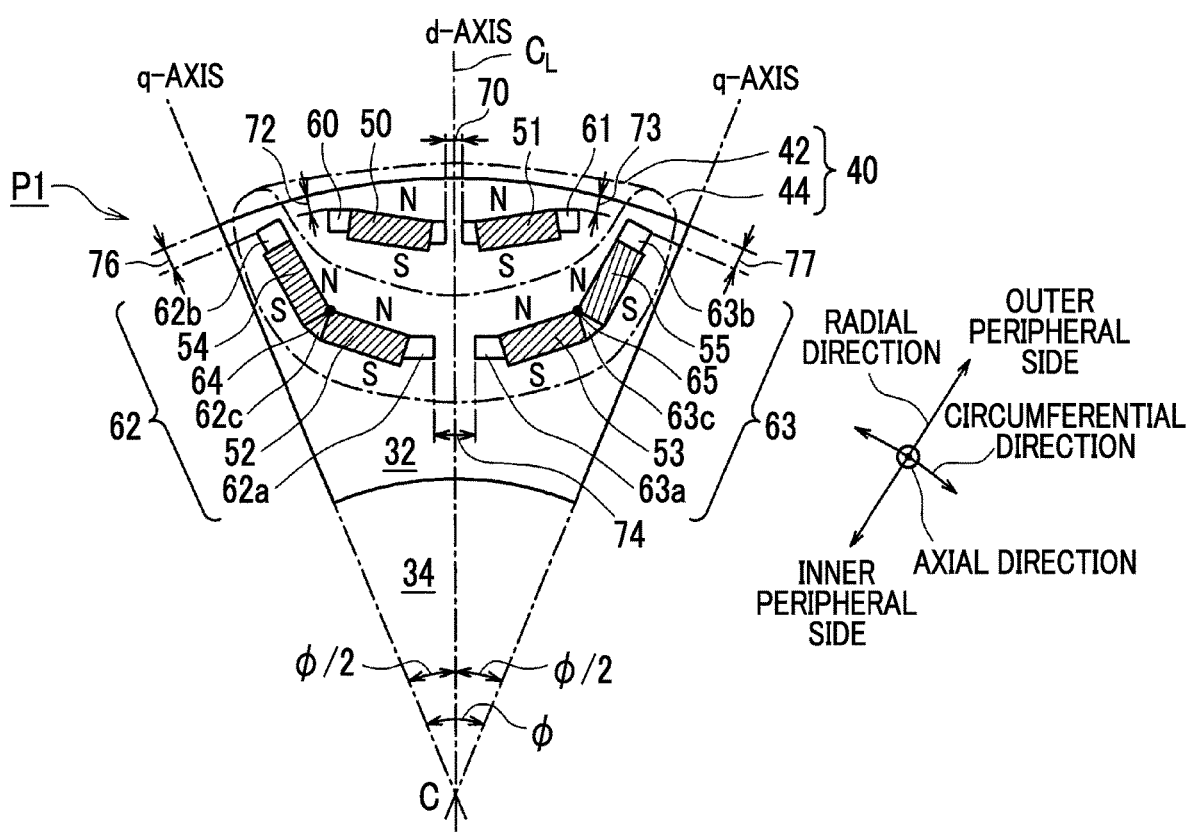
FIG. 2 is an enlarged view of a magnetic pole of FIG. 1.

In FIG. 2, the magnetic pole center of the magnetic pole P1 is indicated by $C_L$. The magnetic pole center $C_L$ is a line which divides the anticipated angle ϕ along the circumferential direction when the magnetic pole P1 is viewed from the center position C into two halves, each ϕ/2, passes through the center position C, and extends toward the outer peripheral side. The magnetic pole center $C_L$ is a d-axis in the magnetic pole P1. A q-axis of the magnetic pole P1 passes through the center position C and is a boundary line between the magnetic pole P1 and each of the magnetic poles P2 and P8 adjacent to the magnetic pole P1.

The outer embedded magnet part 42 includes two permanent magnets 50, 51 which are line-symmetric with respect to the magnetic pole center $C_L$ and are disposed in a V-shape. The two permanent magnets 50, 51 are respectively inserted into the magnet holes 60, 61. The magnet holes 60, 61 are also line-symmetric with respect to the magnetic pole center $C_L$ and are disposed in a V-shape. The V-shape is a shape in which the distance between two parts increases toward the outer peripheral side and the two parts come close to each other on the inner peripheral side.

The inner embedded magnet part 44 includes four permanent magnets 52, 54, 53, 55 which are line-symmetric with respect to the magnetic pole center $C_L$ and are disposed in a U-shape. The permanent magnets 52, 54 are inserted into the magnet hole 62, and the permanent magnets 53, 55 are inserted into the magnet hole 63. The magnet holes 62, 63 are also line-symmetric with respect to the magnetic pole center $C_L$ and are disposed in a U-shape. The U-shape is the same as the V-shape in that it is a shape in which the distance between two parts increases toward the outer peripheral side and the two parts come close to each other on the inner peripheral side. However, the U-shape is different from the V-shape in that bending is made such that an increase in the distance between two parts toward the outer peripheral side becomes smaller along a direction away from the magnetic pole center $C_L$. In FIG. 2, bending positions 64, 65 are shown. The U-shape of the inner embedded magnet part 44 is a shape in which a bent shape having the bending position 64 and a bent shape having the bending position 65 are combined to be disposed line-symmetrically with respect to the magnetic pole center $C_L$.

All the permanent magnets 50, 51, 52, 53, 54, 55 have the same shape and are rectangular bar magnets, in each of which a cross-sectional shape perpendicular to the axial direction is rectangular and a length in the axial direction is slightly shorter than the length in the axial direction of the rotor 30.

As a material of each of the permanent magnets 50, 51, 52, 53, 54, 55, a neodymium magnet containing neodymium, iron and boron as its main components, or a rare-earth magnet such as a samarium cobalt magnet containing samarium and cobalt as its main components is used. Besides this, a ferrite magnet, an alnico magnet, or the like may be used.

All the magnetization directions of the permanent magnets 50, 51, 52, 53, 54, 55 are directed from the outer peripheral side to the inner peripheral side along a shorter side direction. However, the magnetization directions are opposite to each other between the magnetic poles adjacent to each other. In the example of FIG. 2, each of the surfaces facing the outer peripheral side, of the permanent magnets 50, 51, 52, 53, 54, 55, is magnetized to the North pole, and each of the surfaces facing the inner peripheral side is magnetized to the South pole. In contrast, in the magnetic poles P2, P8 adjacent to the magnetic pole P1, each of the surfaces facing the outer peripheral side, of the permanent magnets 50, 51, 52, 53, 54, 55, is magnetized to the South pole, and each of the surfaces facing the inner peripheral side is magnetized to the North pole. In this way, the magnetic pole polarities on the outer peripheral side facing the stator 12 side are alternately disposed with different polarities along the circumferential direction, such as N, S, N, S, N, S, N, S, toward the magnetic pole P8 from the magnetic pole P1. The permanent magnets 50, 51, 52, 53, 54, 55 generate magnetic torque in cooperation with a rotating magnetic field which is generated by the stator 12, when the rotary electric machine 10 operates.

Each of the magnet holes 60, 61 of the outer embedded magnet part 42 has a hole width slightly larger than the shorter side dimension of each of the permanent magnets 50, 51 in a plan view and has hole end portions extending further from both end portions of the longer side of each of the permanent magnets 50, 51 in a longitudinal direction. Also in FIG. 2, the permanent magnets 50, 51 are hatched. The portions which are not hatched in the magnet holes 60, 61 correspond to the hole end portions extending from both end portions of the longer side of each of the permanent magnets 50, 51. The same applies to the inner embedded magnet part 44.

Each of the hole end portions extending further from both end portions of the longer side of each of the permanent magnets 50, 51 is set to have a shape which forms a bridge portion for suppressing flux leakage in the rotor core 32, and is used as an injection port for resin which is filled for the fixing of each of the permanent magnets 50, 51. As the resin for the fixing, thermosetting resin having excellent moldability and heat resistance is used. As the thermosetting resin, epoxy resin, polyimide resin, or the like is used.

An outer center bridge 70 is a magnetic body portion of the rotor core 32, which is located between two hole end portions facing each other and each extending further toward the magnetic pole center $C_L$ side from the end portion on the magnetic pole center $C_L$ side of the longer side of each of the permanent magnets 50, 51. Outer peripheral bridges 72, 73 are magnetic body portions of the rotor core 32, each of which is located between the hole end portion extending toward the outer peripheral side of the rotor core 32 from the end portion on the side opposite to the magnetic pole center $C_L$ side of the longer side of each of the permanent magnets 50, 51, and the outer peripheral end of the rotor core 32, which faces the hole end portion.

The magnet holes 62, 63 of the inner embedded magnet part 44 are bent holes bent at the bending positions 64, 65 in a plan view. The magnet holes 62, 63 are line-symmetric with respect to the magnetic pole center $C_L$, and therefore, the magnet hole 62 will be described. The magnet hole 62 is configured to include a partial hole 62a further on the magnetic pole center $C_L$ side than the bending position 64, a partial hole 62b further on the outer peripheral side than the bending position 64, and a connection hole 62c connecting the two partial holes at the bending position 64. The permanent magnet 52 is inserted into the partial hole 62a, and the permanent magnet 54 is inserted into the partial hole 62b.

Each of the partial holes 62a, 62b has a hole width slightly larger than the shorter side dimension of each of the permanent magnets 54, 52 in a plan view and has hole end portions extending further from both end portions of the longer side of each of the permanent magnets 54, 52 in a longitudinal direction. The hole end portions extending further from both end portions of the longer side of each of the permanent magnets 54, 52 are the same as the hole end portions in the magnet holes 60, 61 in that each of the hole end portions is set to have a shape which forms a bridge portion, and is used as an injection port for resin.

Similarly, the magnet hole 63 is also configured to include a partial hole 63a into which the permanent magnet 53 is inserted, a partial hole 63b into which the permanent magnet 55 is inserted, and a connection hole 63c. Each of the partial holes 63a, 63b has a hole width slightly larger than the shorter side dimension of each of the permanent magnets 53, 55 in a plan view and has hole end portions extending further from both end portions of the longer side of each of the permanent magnets 53, 55 in a longitudinal direction. The partial holes 63a, 63b are also the same as the partial holes 62a, 62b in that each of the hole end portions is set to have a shape which forms a bridge portion, and is used as an injection port for resin which is filled for fixing of each of the permanent magnets 53, 55.

An inner center bridge 74 is a magnetic body portion of the rotor core 32, which is located between portions facing each other and each extending toward the magnetic pole center $C_L$ side from each of the partial holes 62a, 63a. Outer peripheral bridges 76, 77 are magnetic body portions of the rotor core 32, each of which is located between the hole end portion extending toward the outer peripheral side of the rotor core 32 from the end portion on the side opposite to the magnetic pole center $C_L$ side, of each of the partial holes 62b, 63b, and the outer peripheral end of the rotor core 32, which faces the hole end portion.

The outer center bridge 70, the outer peripheral bridges 72, 73, the inner center bridge 74, and the outer peripheral bridges 76, 77 are bridge portions for suppressing flux leakage in the rotor core 32. The narrower the dimension of each bridge portion is and the narrower the width of the magnetic body portion of each bridge portion is, the further the flux leakage can be reduced, and therefore, this contributes to improvement in the output efficiency of the rotary electric machine 10. On the other hand, stress due to a centrifugal force or an excitation force when the rotary electric machine 10 operates is concentrated on each bridge portion, and therefore, if each bridge portion has a relatively narrow dimension, there is a possibility that each bridge portion may be damaged, and thus a rotational frequency can be limited. The stress due to a centrifugal force or an excitation force when the rotary electric machine 10 operates increases as the mass borne by each bridge portion becomes larger.

In particular, the outer center bridge 70 bears the mass of the two permanent magnets 50, 51, whereas the inner center bridge 74 bears the mass of the four permanent magnets 52, 54, 53, 55. Therefore, the length along the circumferential direction of the inner center bridge 74 is set to be longer than the length along the circumferential direction of the outer center bridge 70. In this way, the stress which is applied to the outer center bridge 70 when the rotary electric machine 10 operates and the stress which is applied to the inner center bridge 74 can be equalized, and thus the rotor core 32 as a whole is prevented from receiving large local stress, and the strength of the rotor core 32 is improved. If the strength of the rotor core 32 is improved, the rotary electric machine 10 can be rotated at a higher speed, and thus torque which can be output is improved. Further, it becomes possible to make the bridge portions including the outer center bridge 70 and the inner center bridge 74 thinner, and thus the output efficiency of the rotary electric machine 10 is improved and downsizing of the rotary electric machine 10 becomes possible.

Figure 3:
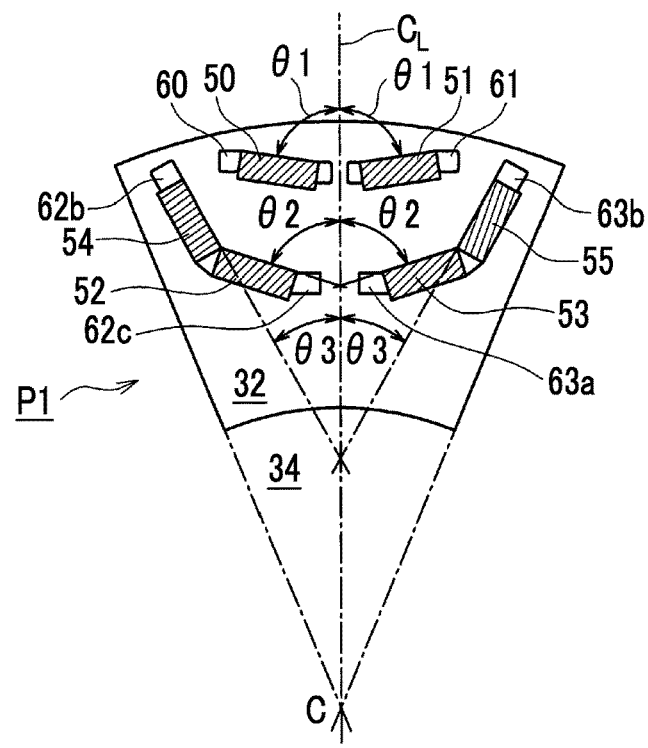
FIG. 3 is a diagram showing an angular relationship between a permanent magnet and a magnetic pole center in FIG. 2.

FIG. 3 is a diagram showing an angular relationship between each of the permanent magnets and the magnetic pole center in FIG. 2. The angle that each of the permanent magnets 50, 51 makes with the magnetic pole center $C_L$ is set to be θ1, the angle that each of the permanent magnets 52, 53 makes with the magnetic pole center $C_L$ is set to be θ2, and the angle that each of the permanent magnets 54, 55 makes with the magnetic pole center $C_L$ is set to be θ3. Here, the angles are set such that the relationships of θ1>θ2, θ1>θ3, and θ2>θ3 are established. A magnitude relationship is θ1>θ2>θ3. The relationships of θ1>θ2 and θ1>θ3 are established, whereby it is possible to secure a wider width dimension of the magnetic body portion between the outer embedded magnet part 42 and the inner embedded magnet part 44 on the magnetic pole center $C_L$ side and it is possible to relieve a magnetic saturation due to local denseness of magnetic fluxes, as will be described later (refer to FIG. 5). Further, the relationship of θ2>θ3 is established, whereby the dimension of the magnetic pole P1 is prevented from becoming excessively large as compared with a case of making θ2 equal to θ3, as will be described later (refer to FIGS. 6 and 7), and thus downsizing of the rotary electric machine 10 is attained.

The operation and effects of the configuration will be described in further detail using the torque characteristic of the embedded magnet type rotary electric machine 10 and FIGS. 4 to 7.

The torque characteristic of the embedded magnet type rotary electric machine 10 is given by an expression, torque T=($P_0$·Ψ)Id+(Ld−Lq)Id·Iq. Here, $P_0$ is the number of magnetic poles, Ψ is an interlinkage magnetic flux, Id is a d-axis current, Iq is a q-axis current, Ld is a d-axis inductance, and Lq is a q-axis inductance. The first term is magnetic torque due to the magnetic flux which is made by the permanent magnets, the second term is reluctance torque, and the torque T is combined torque of the magnetic torque and the reluctance torque.

According to the configuration, the permanent magnets 50, 51, 52, 53, 54, 55 which are six per magnetic pole are used, and therefore, the magnetic flux of the permanent magnets as a whole increases as compared with a magnetic pole structure using two permanent magnets in a general one-layered V-shape with the characteristics of one permanent magnet being the same. Even in comparison with a structure using four permanent magnets in a one-layered V-shape and a structure using four permanent magnets in a two-layered V-shape, likewise, the magnetic flux of the permanent magnets as a whole increases. If the magnetic flux of the permanent magnets as a whole increases, the interlinkage magnetic flux Ψ increases, and therefore, the magnetic torque increases. Hereby, the torque T that the rotary electric machine 10 outputs increases.

Figure 4:
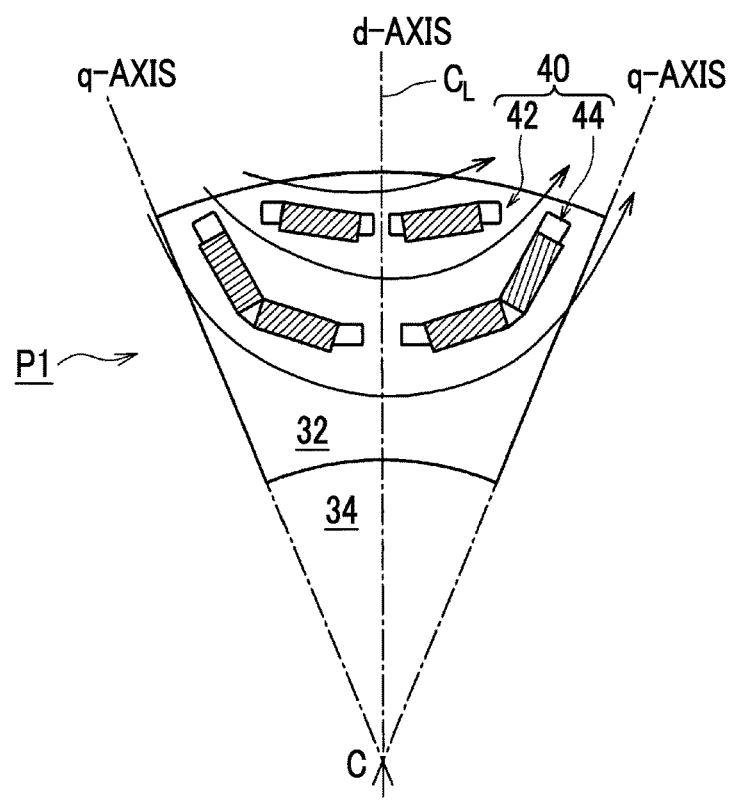
FIG. 4 is a diagram showing a flow of a q-axis magnetic flux in the configuration of FIG. 2.

Next, the q-axis inductance Lq is improved by forming the embedded magnet part 40 into a two-layered structure having the outer embedded magnet part 42 and the inner embedded magnet part 44. FIG. 4 is a diagram in which a flow of the q-axis magnetic flux is shown by an arrow in the embedded magnet part 40 having a two-layered structure with respect to the magnetic pole P1. In the magnetic pole P1, the q-axis magnetic flux flows along the circumferential direction between the q-axis on a first side of the magnetic pole P1, which is the boundary with the magnetic pole adjacent to the magnetic pole P1, and the q-axis on a second side. In contrast, the d-axis magnetic flux flows along the radial direction of the magnetic pole P1. As shown in FIG. 4, the q-axis magnetic flux flows with the magnetic body portion between the outer embedded magnet part 42 and the inner embedded magnet part 44 as a magnetic path, and therefore, the larger the distance between the outer embedded magnet part 42 and the inner embedded magnet part 44, the easier the q-axis magnetic flux flows, and thus the q-axis inductance Lq increases. In contrast, the d-axis magnetic flux which flows along the radial direction of the magnetic pole P1 does not depend much on the magnitude of the distance between the outer embedded magnet part 42 and the inner embedded magnet part 44, and therefore, the d-axis inductance Ld remains substantially constant.

Therefore, as compared with an embedded magnet part having a one-layered structure in which the distance between the outer embedded magnet part 42 and the inner embedded magnet part 44 is zero, the embedded magnet part 40 having a two-layered structure can have a large value of (Lq−Ld). Normally, the d-axis current takes a negative value, and therefore, the larger the value of (Lq−Ld), the further the reluctance torque increases. In this manner, the embedded magnet part 40 having a two-layered structure is adopted, whereby the reluctance torque increases. Hereby, the torque T that the rotary electric machine 10 outputs increases.

Figure 5:
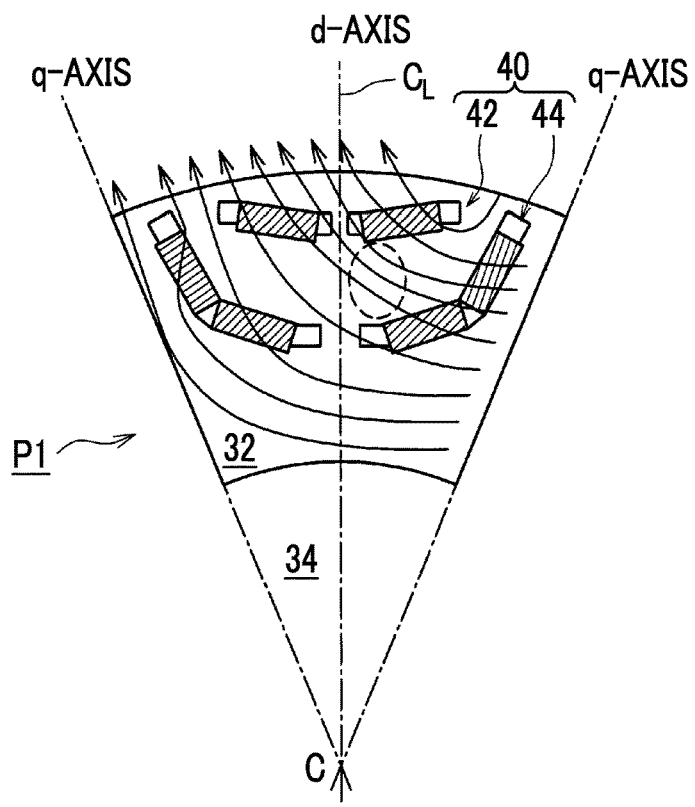
FIG. 5 is a diagram showing an example of a location where magnetic fluxes are dense, in the configuration of FIG. 2.

FIG. 5 is a diagram showing an example in which a magnetic field analysis is performed on the magnetic pole P1 when the rotary electric machine 10 is operated by generating a rotating magnetic field by making a predetermined driving current flow through the stator coil 16. In FIG. 5, local denseness of the magnetic fluxes is slightly generated in a region surrounded by a broken line. The region surrounded by a broken line is a region closer to the magnetic pole center $C_L$ in the magnetic path between the outer embedded magnet part 42 and the inner embedded magnet part 44.

As a reason why the local denseness of the magnetic fluxes is generated in the region surrounded by a broken line, the following can be considered. That is, in the embedded magnet part 40 having a two-layered structure, the outer embedded magnet part 42 has two permanent magnets 50, 51, whereas the inner embedded magnet part 44 has four permanent magnets 52, 53, 54, 55. Therefore, all of the magnetic fluxes which have passed through the four permanent magnets 52, 53, 54, 55 of the inner embedded magnet part 44 cannot be directly directed to the two permanent magnets 50, 51 of the outer embedded magnet part 42, and some of the magnetic fluxes flow toward the magnetic pole center $C_L$, so that the flow of the magnetic fluxes are concentrated densely there. If the local denseness occurs in the flow of the magnetic fluxes, the magnetic body at the dense location is magnetically saturated, and thus the magnetic flux density is saturated. Hereby, the interlinkage magnetic flux Ψ decreases, the magnetic torque decreases, and the torque that the rotary electric machine 10 outputs decreases.

According to the configuration described in FIGS. 2 and 3, it is possible to secure a wider width dimension of the magnetic body portion between the outer embedded magnet part 42 and the inner embedded magnet part 44 on the magnetic pole center $C_L$ side. Hereby, as compared with a case where the width dimension of the magnetic body portion between the outer embedded magnet part 42 and the inner embedded magnet part 44 is constant along the circumferential direction, the local denseness of the magnetic fluxes in the region surrounded by a broken line in FIG. 5 can be relieved, and thus a decrease in the torque that the rotary electric machine 10 outputs can be suppressed.

Figure 6:
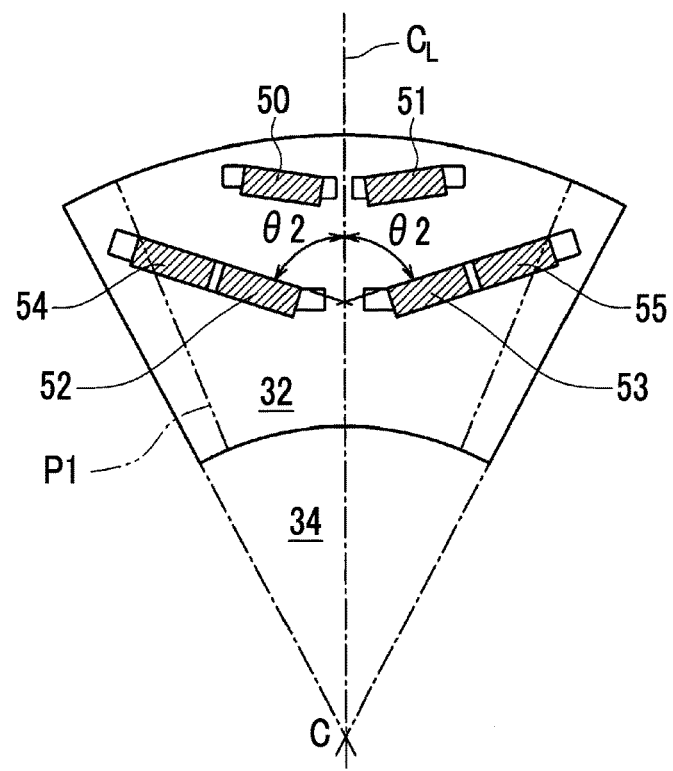
FIG. 6 is a diagram showing one magnetic pole in a case where the relationship of θ2=θ3 is established by matching θ3 to θ2, unlike the relationship of θ2>θ3 in FIG. 3, as a comparative example.

FIGS. 6 and 7 are comparative examples with respect to the configuration. In the configuration, the bending positions 64, 65 are provided in the inner embedded magnet part 44, so that the relationship of θ3<θ2 is established, and thus U-shaped disposition is provided. FIGS. 6 and 7 are two comparative examples in which the bending positions 64, 65 are not provided in the inner embedded magnet part 44.

In FIG. 3, the relationship of θ2>θ3 is established. However, FIG. 6 is a diagram showing one magnetic pole in a case where the relationship of θ2=θ3 is established by increasing θ3 so as to match θ2. In the comparative example, the dimension in the circumferential direction of one magnetic pole increases. The outline of the magnetic pole P1 of FIG. 3 is shown by a two-dot chain line.

In FIG. 3, the relationship of θ3<θ2 is established. However, FIG. 7 is a diagram showing one magnetic pole in a case where the relationship of θ2=θ3 is established by decreasing θ2 in FIG. 3 so as to match θ3. In the comparative example, the inner center bridge is opened too much, and thus the flux leakage becomes too large. The disposition when the inner center bridge is made to the same extent as in FIG. 3 is shown by a broken line. In the comparative example, the dimension in the radial direction of one magnetic pole increases. The outline of the magnetic pole P1 of FIG. 3 is shown by a two-dot chain line.

In this manner, the bending positions 64, 65 are provided in the inner embedded magnet part 44, so that the relationship of θ3<θ2 is established, and thus the U-shaped disposition is provided, whereby as compared with a case where the relationship of θ3=θ2 is established, the dimension of one magnetic pole can be reduced, and thus the downsizing of the rotary electric machine 10 can be attained.

In the configuration described above, in the embedded magnet part 40 having a two-layered structure, the permanent magnets 50, 51 in the outer embedded magnet part 42 are disposed in a V-shape and the permanent magnets 52, 54, 53, 55 in the inner embedded magnet part 44 are disposed in a U-shape. Depending on the specifications of the rotor 30, in particular, the diameter of the rotor, the number of magnetic poles, the dimensions of the permanent magnet, or the like, in the outer embedded magnet part 42, it is possible to provide a U-shaped disposition by making the number of permanent magnets to be four or more. Further, in the inner embedded magnet part 44, smoother U-shaped disposition may be made by making the number of permanent magnets to be six or more and increasing the number of bending positions. At that time, it is favorable that the angle that each of the permanent magnets disposed on the inner peripheral side makes with the magnetic pole center $C_L$ of the U-shape decreases with increasing distance from the magnetic pole center $C_L$, according to an increase in the number of bending positions. In some cases, V-shaped disposition may be made by appropriately selecting θ3 with the number of the permanent magnets being two or four.

The rotary electric machine 10 in the embodiment is provided with the stator 12 around which the stator coil 16 is wound, and the rotor 30 which is concentrically disposed on the inner periphery of the stator 12 with the predetermined magnetic gap 24 therebetween. The rotor 30 includes the rotor core 32, and the permanent magnets 50, 51, 52, 54, 53, 55 which are disposed line-symmetrically with respect to the magnetic pole center $C_L$ and in a V-shape or a U-shape in the rotor core 32, and embedded to be disposed in a two-layered structure having a layer on the outer peripheral side and a layer on the inner peripheral side in the radial direction. The angle θ1 that each of the permanent magnets 50, 51 disposed on the outer peripheral side makes with the magnetic pole center $C_L$ of the V-shape or the U-shape is larger than the angle θ2 or θ3 that each of the permanent magnets 52, 54, 53, 55 disposed on the inner peripheral side makes with the magnetic pole center $C_L$ of the V-shape or the U-shape.

What is claimed is:

1. A rotary electric machine comprising:
a stator around which a stator coil is wound; and
a rotor disposed concentrically with the stator, the rotor disposed with a predetermined gap with respect to an inner peripheral side of the stator, wherein
the rotor includes a rotor core and a plurality of permanent magnets,
the permanent magnets are embedded in the rotor core,
the permanent magnets comprise outer permanent magnets and inner permanent magnets that are disposed in two layers, respectively, the outer permanent magnets being disposed in a layer on an outer peripheral side and the inner permanent magnets being disposed in a layer on an inner peripheral side of the rotor core,
the outer permanent magnets and the inner permanent magnets are respectively disposed line-symmetrically with respect to a magnetic pole center of the rotor core,
the outer permanent magnets having a V-shape and the inner permanent magnets having a U-shape, and
an angle that each of the outer permanent magnets disposed on the outer peripheral side makes with the magnetic pole center of the V-shape is larger than an angle that each of the inner permanent magnets that are disposed on the inner peripheral side and closer to the magnetic pole center makes with the magnetic pole center of the U-shape.

2. The rotary electric machine according to claim 1, wherein the angle that each of the inner permanent magnets which are disposed on the inner peripheral side makes with the magnetic pole center of the U-shape decreases with increasing distance from the magnetic pole center.

3. The rotary electric machine according to claim 2, wherein the U-shape in which the inner permanent magnets are disposed on the inner peripheral side is bent at at least one location along a direction away from the magnetic pole center.

4. The rotary electric machine according to claim 3, wherein a number of the outer permanent magnets which are disposed on the outer peripheral side is two or more, and a number of the inner permanent magnets which are disposed on the inner peripheral side is four or more, per one magnetic pole of the rotary electric machine.

5. The rotary electric machine according to claim 1, wherein:
a length along a circumferential direction of a center bridge of the U-shape in which the inner permanent magnets are disposed on the inner peripheral side is longer than a length along the circumferential direction of a center bridge of the V-shape in which the outer permanent magnets are disposed on the outer peripheral side; and
each of the center bridges is a portion of the rotor core, which is located between each of the outer permanent magnets and the inner permanent magnets which are disposed with the magnetic pole center interposed between each of the outer permanent magnets and the inner permanent magnets.

* * * * *